UNITED STATES PATENT OFFICE.

FRIEDRICH SCHOFER, OF WAIBLINGEN, NEAR STUTTGART, GERMANY.

METHOD OF MAKING PIPES FOR CHIMNEYS.

1,112,725.      Specification of Letters Patent.      Patented Oct. 6, 1914.

No Drawing.      Application filed February 17, 1913. Serial No. 749,012.

*To all whom it may concern:*

Be it known that I, FRIEDRICH SCHOFER, a subject of the German Emperor, residing at Waiblingen, near Stuttgart, in the German Empire, have invented certain new and useful Improvements in Methods of Making Pipes for Chimneys and the like; and I do hereby declare the following to be a full, clear, and exact description of the invention, such as will enable others skilled in the art to which it appertains to make and use the same.

Chimney pieces and pipe sockets for chimneys for conducting hot gases are subject to very high duties with regard to their capacity of withstanding temperatures. It is not sufficient to employ a material which is itself proof against heat; the respective parts must be made so, that they will withstand the very sudden changes of temperature occurring in chimneys. They must allow of being alternately heated to a very high temperature and be again suddenly cooled down, without showing any cracks or fissures. Neither should steam affect them. It has been suggested to use concrete, which is composed of cement and broken bricks. Such a material is indeed better than any other kind of concrete. It will, however, nevertheless not be quite satisfactory, as it is impossible to obtain a suitable structure. The fine particles in the brick material will render the concrete sensitive.

I have found that it is possible to obtain chimney tile free of all tension, and withstanding the changes of temperature if alcohol or spirit is added to the mixture of cement and crushed bricks or crushed fireclay, which has been slightly wetted with water, whereupon the material is shaken into the molds. This is done gradually and the molds are then shaken in a vertical direction. The alcohol will prevent a too close settling. Besides it will, in evaporating, produce pores. This is my intention, for I have observed, that the pores render the material proof against heat and free of tension. For instance I employ a mixture of 20 parts of cement and 80 parts of crushed bricks, to which I add 6 parts of water and 5 parts of alcohol. The well mixed mass I then slowly fill into the mold standing on a shaking table. A further improvement of the method according to the present invention consists in adding a small amount of oil to the alcohol.

I claim:

1. The method of making fire-resisting cement articles, which comprises mixing cement with crushed brick that has been wetted with a small quantity of water, adding alcohol to the mixture, molding the mass so obtained and allowing the cement to set.

2. The method of making fire-resisting cement articles, which comprises mixing cement with burnt clay that has been wetted with a small quantity of water, adding to the mixture alcohol mixed with an oil, and molding the final mixture.

3. The method of making fire-resisting cement articles, which comprises mixing cement and a comminuted burnt clay filler with about six parts of water and adding to the mixture about five parts of an alcohol mixed with a small quantity of oil, shaking the mixture down in molds and allowing it to set.

In testimony that I claim the foregoing as my invention, I have signed my name in presence of two subscribing witnesses.

FRIEDRICH SCHOFER.

Witnesses:
     FRIDE KLABER,
     ERNEST ENTENMANN.

---

Copies of this patent may be obtained for five cents each, by addressing the "Commissioner of Patents Washington, D. C."